(12) United States Patent
Wang et al.

(10) Patent No.: US 7,854,849 B2
(45) Date of Patent: Dec. 21, 2010

(54) COMPACT MULTIPHASE INLINE BULK WATER SEPARATION METHOD AND SYSTEM FOR HYDROCARBON PRODUCTION

(75) Inventors: Shoubo Wang, Tulsa, OK (US); Luis Gomez, Tulsa, OK (US); Ram Mohan, Broken Arrow, OK (US); Ovadia Shoham, Tulsa, OK (US)

(73) Assignee: Multiphase Systems Integration, Broken Arrow, OK (US)

( * ) Notice: Subject to any disclaimer, the term of this patent is extended or adjusted under 35 U.S.C. 154(b) by 1107 days.

(21) Appl. No.: 11/548,042

(22) Filed: Oct. 10, 2006

(65) Prior Publication Data

US 2008/0087608 A1     Apr. 17, 2008

(51) Int. Cl.
*C02F 1/00*     (2006.01)
(52) U.S. Cl. ..................... 210/744; 210/788
(58) Field of Classification Search ........... 210/702, 210/96.1, 744, 788; 95/253; 96/183
See application file for complete search history.

(56) References Cited

U.S. PATENT DOCUMENTS

| | | | |
|---|---|---|---|
| 4,778,443 A | 10/1988 | Sands et al. | |
| 4,948,393 A | 8/1990 | Hodson et al. | |
| 5,302,294 A * | 4/1994 | Schubert et al. | ............. 210/702 |
| 5,507,958 A | 4/1996 | White-Stevens | |
| 6,132,494 A | 10/2000 | Kjos et al. | |
| 6,197,095 B1 | 3/2001 | Ditria et al. | |
| 2003/0168391 A1 * | 9/2003 | Tveiten | ............. 210/188 |

FOREIGN PATENT DOCUMENTS

| | | |
|---|---|---|
| WO | WO9219352 | 11/1992 |
| WO | WO9740903 | 11/1997 |
| WO | WO03033872 | 4/2003 |
| WO | WO 2004007908 A1 * | 1/2004 |

* cited by examiner

*Primary Examiner*—Walter D Griffin
*Assistant Examiner*—Cameron J Allen
(74) *Attorney, Agent, or Firm*—Head, Johnson & Kachigian, P.C.

(57) ABSTRACT

A method and apparatus for inline, controlled water separation from a multiphase hydrocarbon production stream. The method includes the steps of directing the multiphase hydrocarbon production stream to a gas/liquid separator in order to separate into a gas stream and a liquid stream. The level of liquid in the gas/liquid separator is monitored and controlled. The liquid stream removed from the gas/liquid separator is directed to an enlarged pipe section in order to separate into an oil portion and a water portion. The level of the oil portion in the enlarged pipe section is monitored and controlled. The water portion from the enlarged pipe section is directed to a liquid-liquid cyclone centrifugal separator in order to separate into a water stream and a hydrocarbon concentrated stream. The water stream from the liquid cyclone centrifugal separator is directed to at least one de-oiling hydrocyclone separator. The oily water stream is directed back to the production stream for further processing and the water stream is delivered for disposal.

12 Claims, 7 Drawing Sheets

COMPACT MULTIPHASE INLINE BULK WATER SEPARATION METHOD AND SYSTEM FOR HYDROCARBON PRODUCTION

BACKGROUND OF THE INVENTION

1. Field of the Invention

The present invention is directed to a compact multiphase inline water separation system to segment and separate a significant portion of bulk water that is produced during oil and gas production and delivered with the production stream. The water separated from the production stream by the present invention will be clean enough for disposal or re-injection back into the reservoir or otherwise disposed of. The remaining production stream minus the removed water may then be sent to existing processing facilities.

2. Prior Art

Various systems, processes and structures are well known to separate water that is produced during production of an oil and gas well. The amount of water produced varies widely depending on the particular geological formation, and also depending on the age of the well. For example, in some wells, oil or gas will be the greatest percentage of the fluids produced. Over time, more and more water will be produced from the well.

Accordingly, it is desirable to remove the water from the production stream. Various types of status separation systems and devices are well known. For example, various gravity type separators are used to separate two or three phases into their constituent portions. While these serve the function they are designed for, they are not suitable to operate in an in-line, dynamic system where the amount of fluids, the pressures and the temperatures vary.

Various prior designs for staged separation systems have been proposed in the past. For example, Sands et al. (U.S. Pat. No. 4,778,443) discloses a multistage separator system using a centrifugal counter current liquid/liquid contactor.

Hudson et al. (U.S. Pat. No. 4,948,393) discloses a first stage separator for separation into three components with water removed therefrom directed to a hydrocyclone.

There remains a need for an inline water separation system that is both compact and may be used inline during oil and gas production to remove a significant portion of the water which is delivered along with the production stream.

Accordingly, it would be desirable to provide an in-line water separation system which could be dynamically monitored and controlled to separate bulk water from a hydrocarbon production stream.

It would also be desirable to provide an inline compact water separation system to separate a significant portion of produced water from a production stream with the remaining production fluids such as gas, oil and a small portion of water (sent to existing processing facilities).

It would also be desirable to provide an inline water separation system wherein the quality of the separated water meets all requirements for reinjecting the water or disposing of directly.

SUMMARY OF THE INVENTION

The present invention is directed to an inline water separation method and system to separate bulk water from a multiphase gas-oil-water production stream. Initially, a cylindrical cyclonic gas/liquid separator separates a gas phase from a liquid phase or liquid phases. A gas stream exits from the top of the gas/liquid separator and a liquid stream exits from the bottom of the separator. A liquid level sensor measures liquid level in the gas/liquid separator and in combination with a controller and a gas control valve maintains the liquid level in the separator around a desired set point or level.

The liquid mixture flows into an enlarged pipe section to promote oil-water stratification. The enlarged pipe section has an upward inclination angle of 3-5 degrees from horizontal. The liquid in the enlarged pipe section separates into an oil portion on the top of the pipe and a water portion on the bottom of the pipe. The oil portion exits from the top of the pipe and the water portion exits from the bottom of the pipe. Flow of the oil portion is controlled by a control valve in communication with a controller and an oil-water monitor on the underflow stream to ensure minimum water carry-over and oil carry-under. The water portion flows into a cyclonic liquid-liquid centrifugal separator that further separates the water portion into a water stream and a hydrocarbon concentrated stream. The hydrocarbon concentrated stream exits and is removed from the top of the cyclone centrifugal separator and is recombined with overflow from the enlarged pipe section. The hydrocarbon concentrated stream separated from both the pipe separator and the liquid cyclone separator are either combined with the gas stream or separately flow to downstream processing facilities or pipelines for further processing.

The oil concentration of the water stream from the cyclone centrifugal separator is monitored by an oil in water monitor device and controlled by a control valve on the overflow line.

The water stream from the cyclone separator flows or is pumped into a de-oiling liquid-liquid hydrocyclone separator form removal of small oil drops from water forming into an oily water stream and a clean or water stream. The clean or water stream can be discharged or injected back to a reservoir or otherwise disposed of. The oily stream exits from the top of the liquid-liquid hydrocyclone separator and is pumped back into the production stream for further processing.

An optional second stage liquid-liquid hydrocyclone may be needed for further cleaning of the water to satisfy lower oil concentration requirements.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
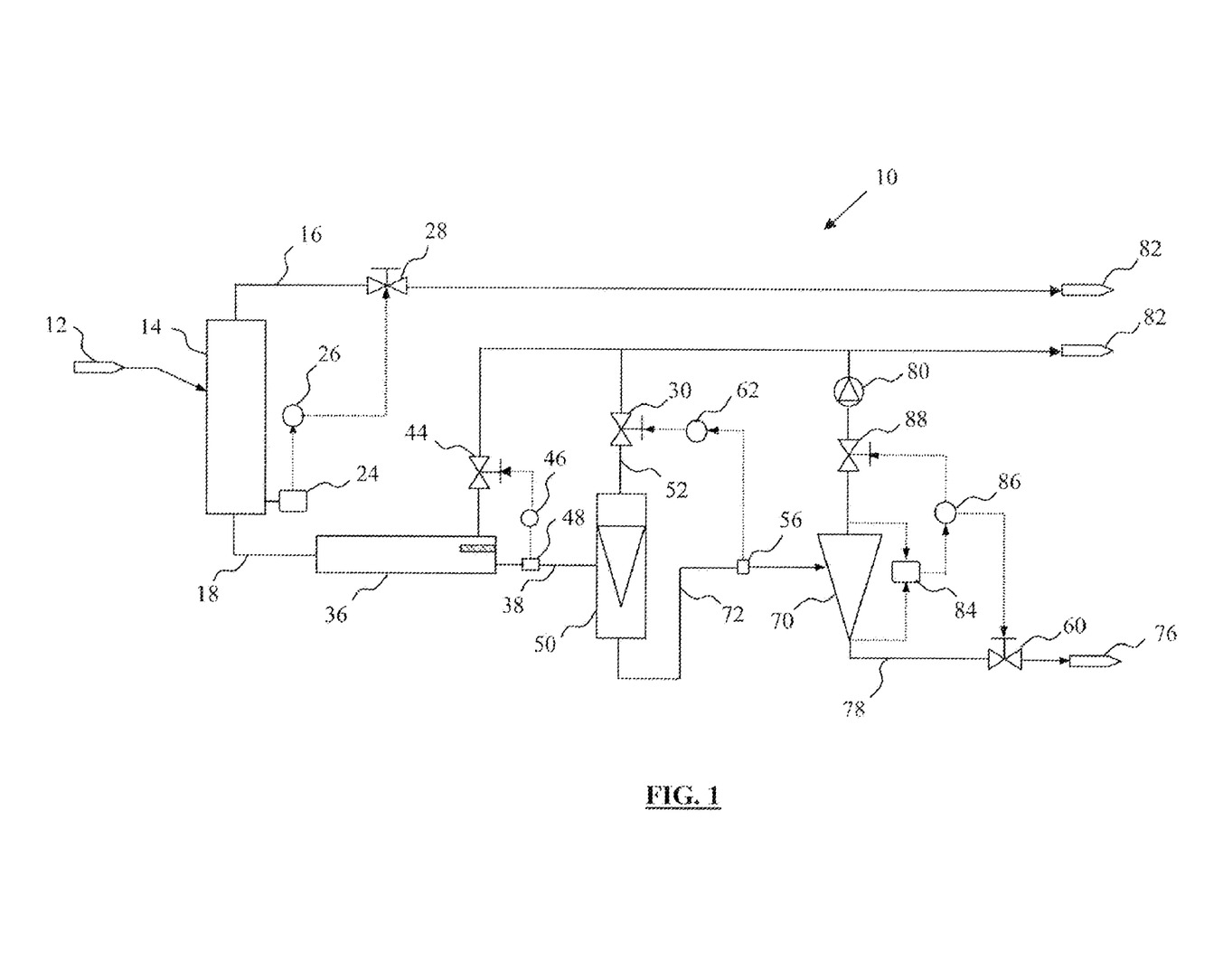
FIG. 1 is a simplified schematic diagram of a process and a system for inline bulk water separation from a multiphase gas-oil-water production stream.

FIG. 1 illustrates a simplified schematic diagram of a process and system 10 of the present invention. A multiphase oil-gas-water production stream from a single well, or a multiple well manifold, or a production pipeline 12 flows into the compact inline water separation system 10. A compact gas/liquid separator 14 separates the gas phase from the liquid phase or phases. In the present embodiment, a cylindrical cyclone separator 14 is utilized although it will be appreciated that other types of gas/liquid separators may be utilized. A gas stream exits from the top of the gas/liquid separator 14 via gas line 16 and a liquid stream exits from the bottom of the separator 14 via line 18.

A liquid level sensor 24 measures the liquid level in the gas/liquid separator 14 and sends a signal to a controller 26 in communication therewith. The controller is capable of closing or opening gas valve 28. An intelligent control strategy is implemented to control a gas valve 28 in the gas line 16 and/or a liquid valve 30 (to be described below) based on inlet flow conditions to maintain the liquid level in the separator 14 around a desired set point or desired parameters. In other words, the sensor 24 operates in conjunction with the controller 26 and gas valve 28 to prevent flooding of liquid in the gas line 16 and prevent gas from entering line 18.

The liquid mixture stream with a small amount of entrained gas from the gas/liquid separator 14 flows via line 18 into an enlarged pipe section 36 in which oil-water stratified flow occurs. A cylindrical pipe section is employed in the present embodiment. The liquid in the pipe 36 is separated into an oil portion and a water portion.

Figure 2:
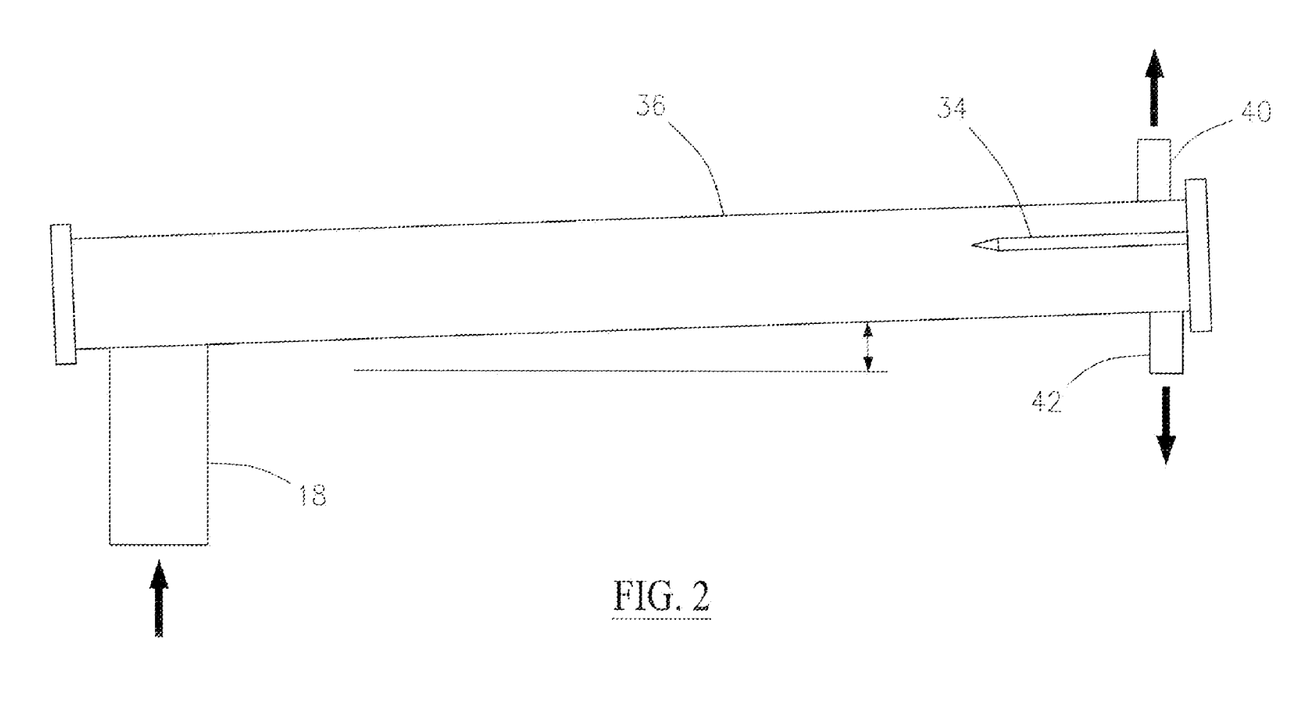
FIG. 2 illustrates a simplified diagram of an enlarged pipe section used as a part of the process and system of the present invention.

As seen in the simplified view of the pipe 36 in FIG. 2, the oil exits from the top 40 and water exits from the bottom 42. The pipe section 36 may also include an internal isolation plate 34 to discourage turbulence or vortex effects from the oil and water exiting. The enlarged pipe section 36 may be installed at an upward inclination of from 3-5 degrees from horizontal (shown in dashed lines).

Returning to a consideration of FIG. 1, the flow of the oil is controlled by a control valve 44, a controller 46 and an oil-water interface sensor 48 to ensure minimum water carry-over. In the present embodiment, the interface sensor 48 is a probe extending into the pipe to determine physical or electrical properties of the fluid and thereby determine the interface of oil versus water.

The water portion flows via line 38 into a liquid-liquid cylindrical cyclone centrifugal separator 50 that further separates the water portion into a water stream and hydrocarbon concentrated stream. The hydrocarbon concentrated stream with a small amount of water exits and is removed from the tope of the separator 50 via line 52 and is recombined with the overflow from enlarged pipe section 36. The hydrocarbon concentrated stream separated from both the pipe section 36 and liquid-liquid cyclone separator 50 are either combined with the gas stream from the gas liquid cyclone separator or separately flow to downstream processing facilities or pipelines for further processing.

The hydrocarbon concentrated water stream exiting from the separator 50 is monitored by a real-time monitor device 56 and controlled by either control valve 30 or control valve 60 using a controller 62 when the pressure is high enough to drive a de-oiling hydrocyclone 70.

The water stream from the liquid-liquid cyclone separator 50 flows via line 72 into a de-oiling liquid-liquid hydrocyclone separator 70 for removal of small oil drops and for further refining of the water quality, forming an oily water stream and a clean or water stream. The clean or water stream can be discharged or injected via line 78 back to a reservoir or otherwise disposed of as shown by arrow 76.

The oily water stream exits from the top of the separator 70 and is pumped via pump 80 back into the production stream 82. A control system, including a sensor 84, controller 86, control valve 88 and control valve 60, is used to maximize the efficiency of the hydrocyclone separator 70.

An optional de-sanding hydrocyclone (not shown) may be added either in front of the de-oiling hydrocyclone or downstream of the de-oiling hydrocyclone for removal of sands.

Figure 3:
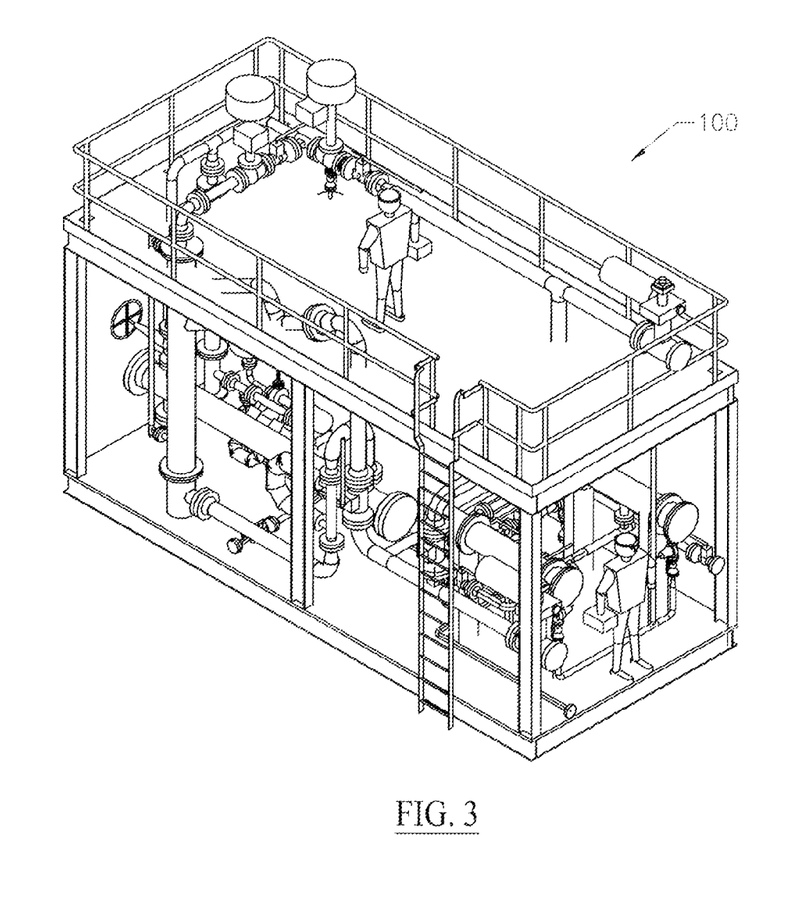
FIG. 3 illustrates a perspective view of one embodiment utilizing the teachings and principles of the present invention.

FIG. 3 shows a perspective view of a prototype of one implementation of the teachings of the present invention as shown in FIGS. 1 and 2. A prototype compact multiphase inline water separation system 100 utilizes a three inch diameter inlet with inlet flow conditions of approximately 2,000 bbl/day of liquid and 400 msct/d of gas at 120 psi and 97 degree F. An inlet or inlets are provided into a gas/liquid cylindrical cyclone separator. By way of example, the cylindrical cyclone gas/liquid separator may have a diameter of approximately 6 inches and a height of approximately 10 feet.

Figure 4:
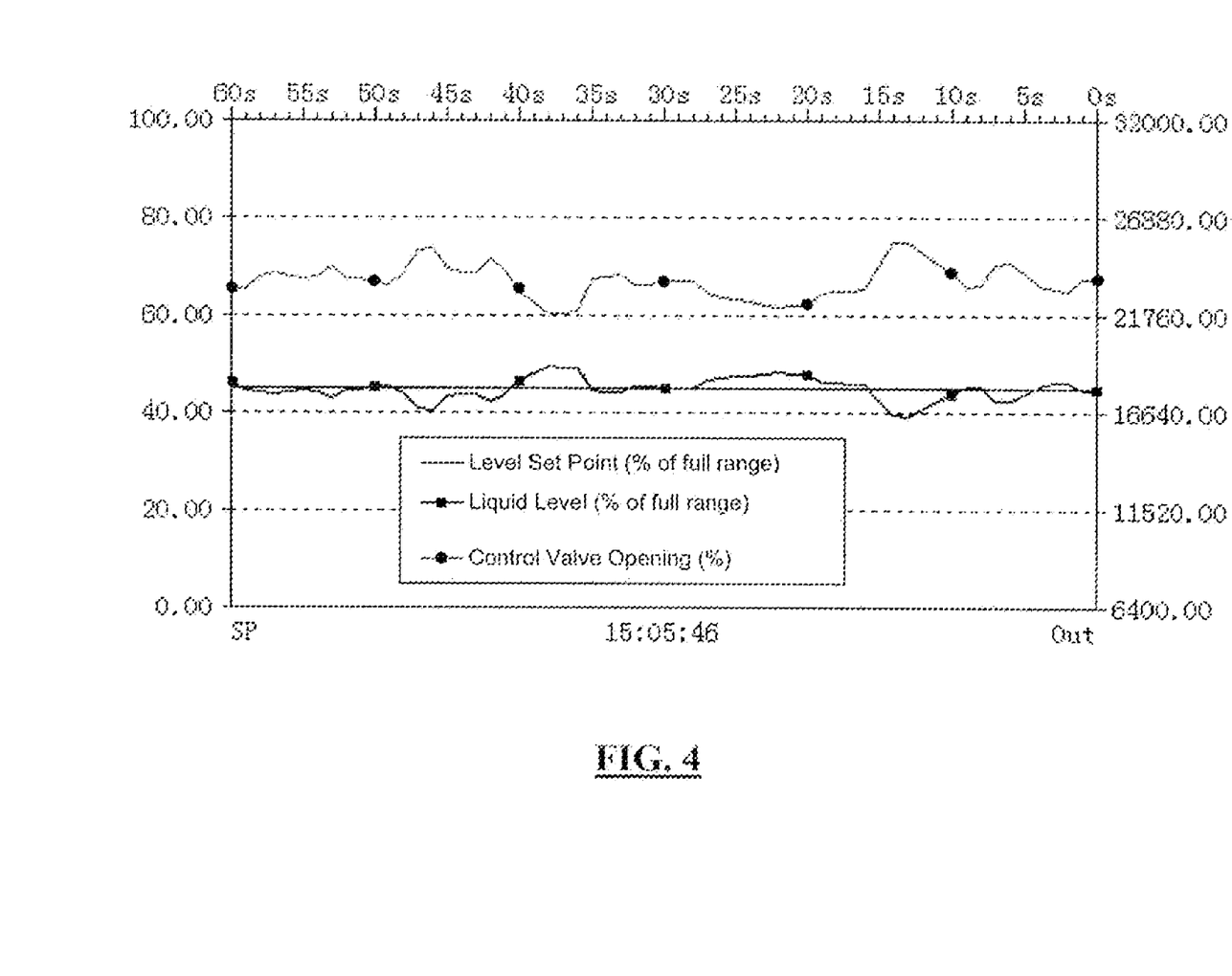
FIG. 4 illustrates a graph of the liquid level control results for a prototype tested in the field.

A differential pressure sensor senses the liquid level and operates in conjunction with a program logic controller (PLC) to operate a gas valve on the gas outlet line. The liquid level response and the control valve response are shown in the graph in FIG. 4.

Figure 5:
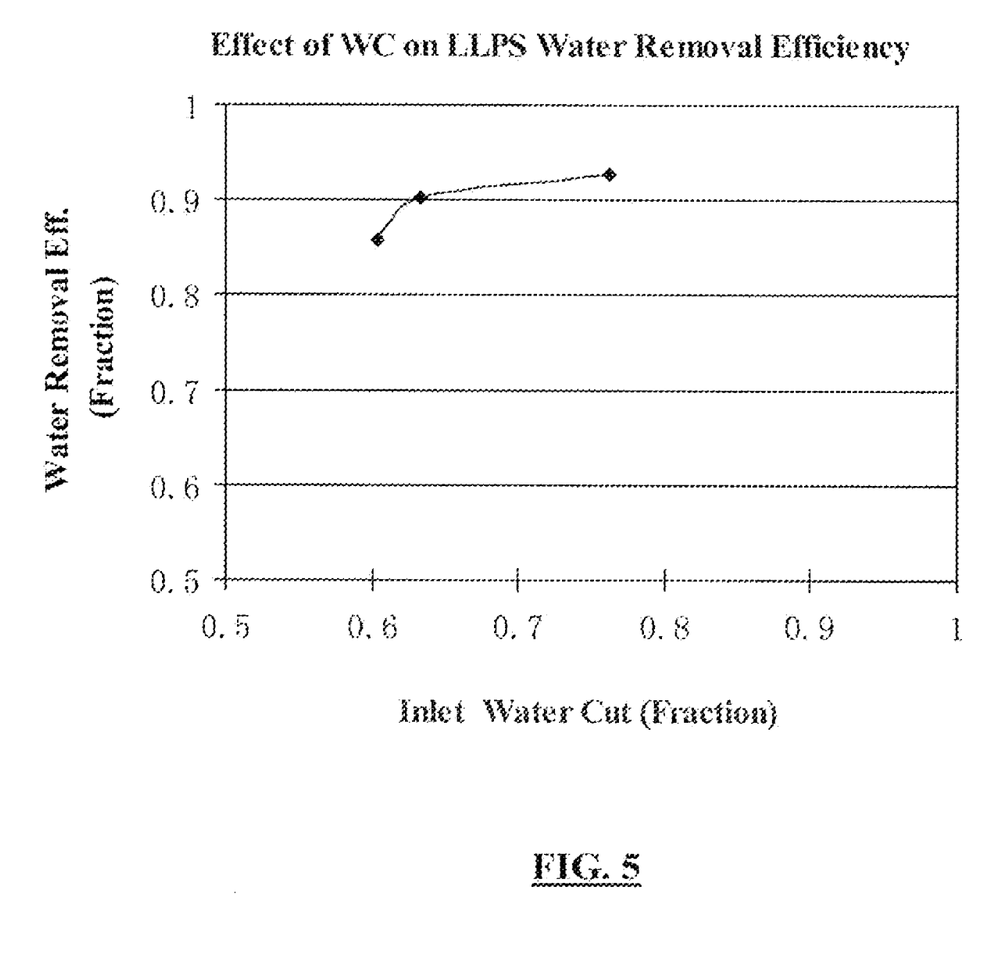
FIG. 5 illustrates a graph of the water removal efficiency for the enlarged pipe section.

A liquid stream exiting from the bottom of the gas/liquid separator flows into an enlarged pipe section having a diameter of approximately 6 inches and a length of approximately 10 feet at approximately the same inlet conditions. The fluids are separated into an oil portion and a water portion. The oil portion exits from the tope of the pipe and is controlled by a control valve on the overflow line. The water removal efficiency (the percentage of water separated from the mixture) is shown in the graph in FIG. 5.

Figure 6:
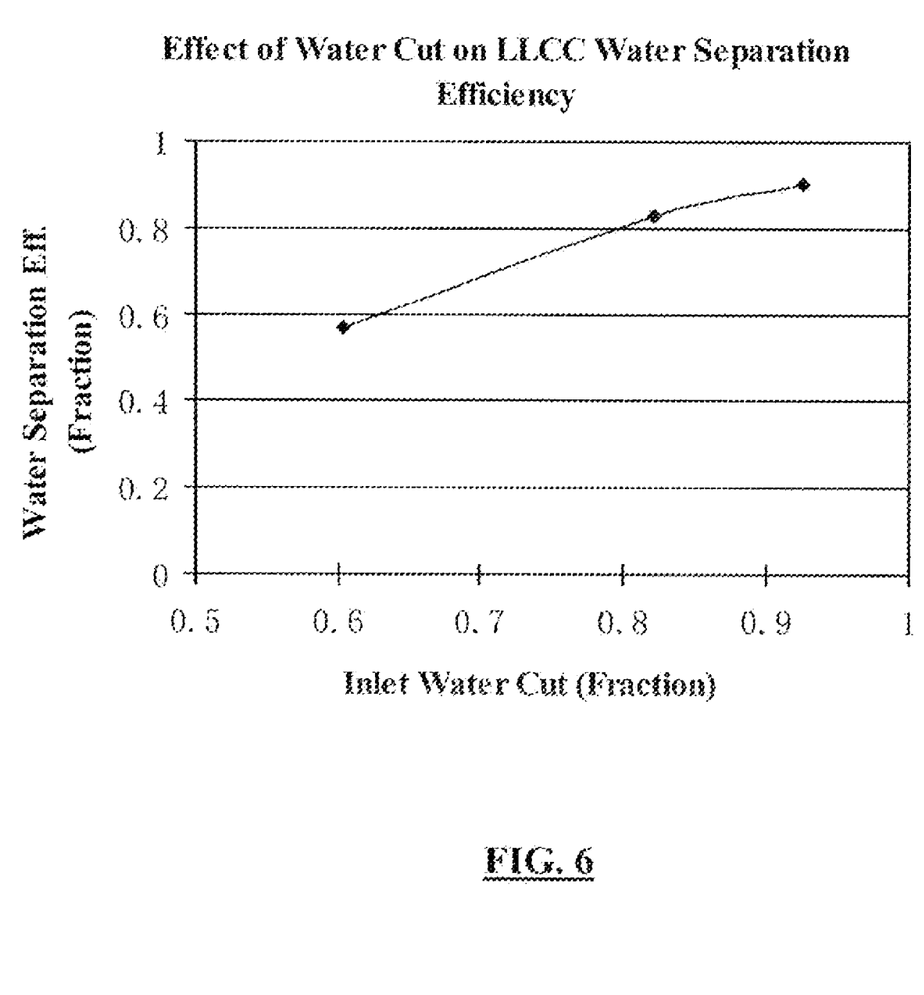
FIG. 6 illustrates a graph of the water separation efficiency for the liquid-liquid cyclonic separator.

The water portion is delivered to a liquid-liquid centrifugal separator which serves to separate the water portion into two streams, a water stream and a hydrocarbon concentrated stream. By was of example, the centrifugal separator has a diameter of 3" and a height of 4 ft. The water separation efficiency is shown as a percentage in the graph in FIG. 6.

The concentrated stream from the liquid-liquid cyclone separator flows into a liquid-liquid hydrocyclone separator for removal of small oil drops and refining of the water quality. The oily water stream may flow at approximately 3-5% of the inlet flow rate. The quality water stream may optionally be delivered to further hydrocyclone separators, such as a separator, for further cleaning of the quality water.

Figure 7:
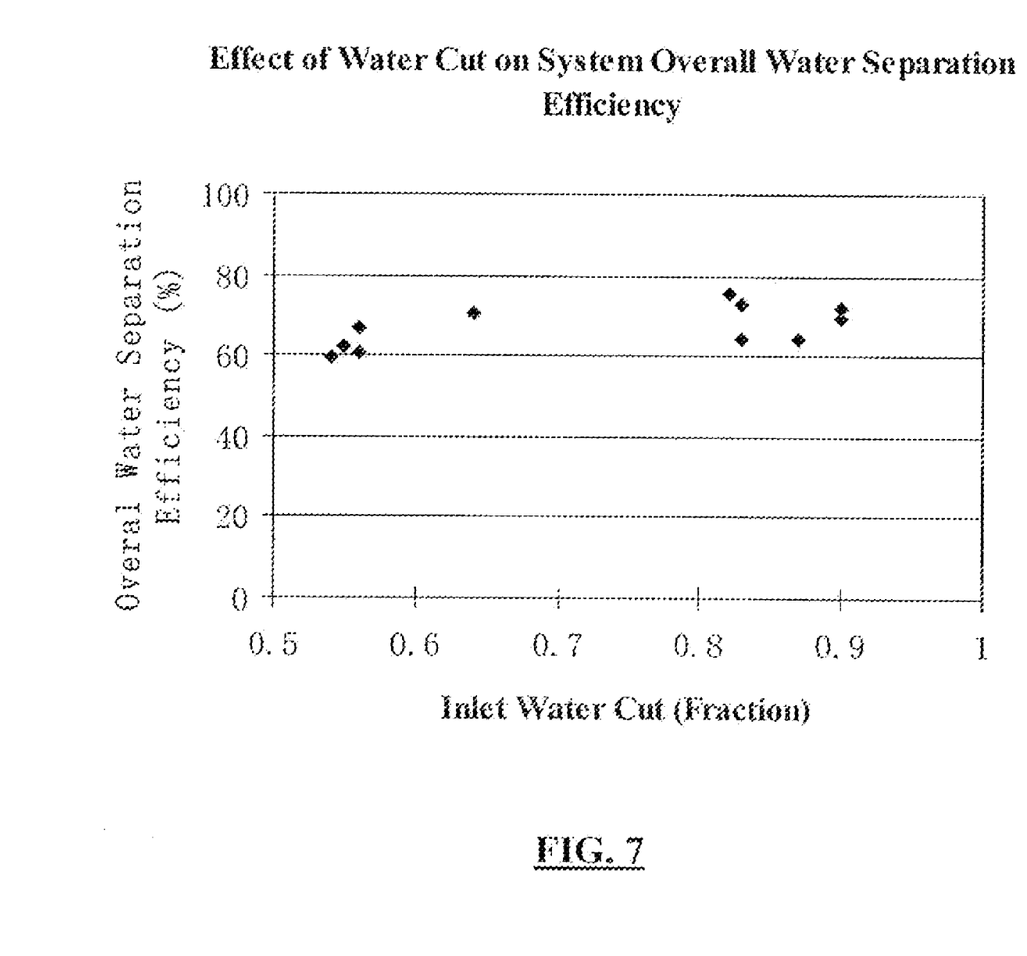
FIG. 7 illustrates a graph of the overall water separation efficiency for the multiphase inline water separation system.

The quality water stream may have as little as 40 ppm of hydrocarbons. The water removal efficiency of the present invention range from 60-80% based on inlet flow conditions as shown in FIG. 7.

Whereas, the present invention has been described in relation to the drawings attached hereto, it should be understood that other and further modifications, apart from those shown or suggested herein, may be made within the spirit and scope of this invention.

What is claimed is:

1. A method of inline, controlled water separation from a multiphase hydrocarbon production stream, which method comprises:

directing said multiphase hydrocarbon production stream to a gas/liquid separator to separate into a gas stream and a liquid stream;

directing said gas stream removed from said gas/liquid separator through a gas control valve;

monitoring and controlling a level of liquid in said gas/liquid separator;

directing said liquid stream removed from said gas/liquid separator to an enlarged pipe section to separate into an oil portion and a water portion;

monitoring and controlling the interface of said oil portion in said enlarged pipe section;

discouraging a turbulence or vortex effect from flow of oil and water by an internal isolation plate within said enlarged pipe section;

directing said water portion from said enlarged pipe section to a liquid-liquid cyclone centrifugal separator to separate into a water stream and a hydrocarbon concentrated stream;

directing said water stream to a de-oiling hydrocyclone separator to separate into an oily water stream and a clean or water stream; and directing said oily water stream back to the production stream and delivering said clean or water stream for disposal.

2. The method of Claim 1 wherein said gas/liquid separator is a cylindrical cyclone separator.

3. The method of Claim 1 wherein said step of monitoring and controlling the level of liquid in said gas/liquid separator includes a liquid level sensor, and a liquid level controller operating in combination with said gas control valve.

4. The method of claim 1 including the additional steps of metering said gas stream from said gas/liquid separator and metering said liquid stream from said gas/liquid separator.

5. The method of claim 1 including the step of directing said hydrocarbon stream to more than one said de-oiling hydrocyclone arranged in series.

6. The method of claim 3 including the step of mounting all said separators, said gas control valve, said enlarged pipe section, and said isolation plate on an integrated unit.

7. An inline, controlled water separation system :for a multiphase hydrocarbon production stream, which system comprises:

a gas/liquid separator to separate said production stream into a gas stream and a liquid stream;

a sensor and a controller in communication with a gas control valve to control a level of liquid in said gas/liquid separator;

an oil/water separator to separate said liquid stream into an oil portion and a water portion;

an internal isolation plate within said oil/water separator to discourage turbulence or a vortex effect when oil and water exit from said oil/water separator;

means to monitor and control a level of said oil portion in said oil/water separator;

a liquid cyclone centrifugal separator to separate said water portion into a water stream and a hydrocarbon stream; and a de-oiling hydrocyclone separator to separate said water stream into an oily water stream and a clean or water stream.

8. A water separation system as set forth in Claim 7 wherein said gas/liquid separator is a cylindrical cyclone separator.

9. A water separation system as set forth in claim 7 wherein said oil-water separator is an enlarged pipe section.

10. A water separation system as set forth in claim 7 including means to control said liquid cyclone centrifugal separator.

11. A water separation system as set forth in claim 7 including more than one said de-oiling hydrocyclone separator.

12. A water separation system as set forth in claim 7 wherein all of said separators, said sensor, said controller, said gas control valve, and said internal isolation plate arc mounted on an integrated unit.

\* \* \* \* \*